United States Patent
Kamran et al.

(10) Patent No.: US 11,392,295 B2
(45) Date of Patent: Jul. 19, 2022

(54) FRONT-END OFFLOAD OF STORAGE SYSTEM PROCESSING

(71) Applicant: EMC IP Holding Company LLC, Hopkinton, MA (US)

(72) Inventors: Lior Kamran, Rishon LeZion (IL); Amitai Alkalay, Kadima (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 149 days.

(21) Appl. No.: 16/884,133

(22) Filed: May 27, 2020

(65) Prior Publication Data
US 2021/0373773 A1  Dec. 2, 2021

(51) Int. Cl.
*G06F 3/06* (2006.01)

(52) U.S. Cl.
CPC .......... *G06F 3/0608* (2013.01); *G06F 3/0659* (2013.01); *G06F 3/0673* (2013.01)

(58) Field of Classification Search
CPC ..... G06F 3/0608; G06F 3/0659; G06F 3/0673
See application file for complete search history.

(56) References Cited

U.S. PATENT DOCUMENTS

| | | |
|---|---|---|
| 7,165,155 B1 | 1/2007 | Duprey et al. |
| 7,440,982 B2 | 10/2008 | Lu et al. |
| 7,444,464 B2 | 10/2008 | Urmston et al. |
| 8,095,726 B1 | 1/2012 | O'Connell et al. |
| 8,214,612 B1 | 7/2012 | Natanzon |
| 8,301,593 B2 | 10/2012 | Hoffmann et al. |
| 8,335,899 B1 | 12/2012 | Meiri et al. |
| 9,104,326 B2 | 8/2015 | Frank et al. |
| 9,208,162 B1 | 12/2015 | Hallak et al. |
| 9,286,003 B1 | 3/2016 | Hallak et al. |

(Continued)

FOREIGN PATENT DOCUMENTS

| | | |
|---|---|---|
| WO | 2016111954 A1 | 7/2016 |
| WO | PCT/US2019/024885 | 1/2020 |
| WO | PCT/US2019/024900 | 1/2020 |

OTHER PUBLICATIONS

EMC Corporation, "Introduction to the EMC XtremIO Storage Array (Ver. 4.0): A Detailed Review," White Paper, Apr. 2015, 65 pages.

(Continued)

*Primary Examiner* — Eric Cardwell
(74) *Attorney, Agent, or Firm* — Ryan, Mason & Lewis, LLP

(57) ABSTRACT

A storage system in one embodiment comprises a front-end device and a plurality of storage nodes. A given storage node of the plurality of storage nodes comprises at least one processor and memory. The front-end device is configured to obtain a write operation comprising at least a first data page and to generate a content-based signature based at least in part on the first data page. The front-end device is further configured to compress the first data page and to generate first compression information corresponding to the first data page. The first compression information comprises an indication that the first data page has been compressed. The front-end device is further configured to provide the generated content-based signature, the compressed first data page and the first compression information to the given storage node.

20 Claims, 8 Drawing Sheets

(56) References Cited

U.S. PATENT DOCUMENTS

| | | | |
|---|---|---|---|
| 9,514,014 | B2 | 12/2016 | Webman et al. |
| 9,552,258 | B2 | 1/2017 | Hallak et al. |
| 9,606,870 | B1 | 3/2017 | Meiri et al. |
| 9,716,754 | B2 | 7/2017 | Swift |
| 9,891,994 | B1 | 2/2018 | Schneider et al. |
| 10,176,046 | B1 | 1/2019 | Hu et al. |
| 10,261,693 | B1 | 4/2019 | Schneider et al. |
| 10,324,640 | B1 | 6/2019 | Chen et al. |
| 10,338,851 | B1 | 7/2019 | Kronrod et al. |
| 10,359,965 | B1 | 7/2019 | Stronge et al. |
| 10,394,485 | B1 | 8/2019 | Chen et al. |
| 10,437,501 | B1 | 10/2019 | Kucherov et al. |
| 10,437,855 | B1 | 10/2019 | Stronge et al. |
| 10,466,925 | B1 | 11/2019 | Blanco et al. |
| 10,496,324 | B2 | 12/2019 | Meiri et al. |
| 10,496,489 | B1 | 12/2019 | Chen et al. |
| 10,496,672 | B2 | 12/2019 | Meiri et al. |
| 10,558,613 | B1 | 2/2020 | Shveidel et al. |
| 10,592,159 | B2 | 3/2020 | Kucherov et al. |
| 10,592,161 | B1 | 3/2020 | Chen et al. |
| 10,606,519 | B1 | 3/2020 | Shveidel |
| 2007/0022121 | A1 | 1/2007 | Bahar et al. |
| 2008/0279462 | A1 | 11/2008 | Celi, Jr. |
| 2009/0132955 | A1 | 5/2009 | Garg et al. |
| 2009/0276593 | A1 | 11/2009 | Jacobson et al. |
| 2010/0179941 | A1 | 7/2010 | Agrawal et al. |
| 2011/0022566 | A1 | 1/2011 | Beaverson et al. |
| 2011/0225123 | A1 | 9/2011 | D'Souza et al. |
| 2012/0124282 | A1 | 5/2012 | Frank et al. |
| 2013/0305002 | A1 | 11/2013 | Hallak et al. |
| 2013/0325824 | A1 | 12/2013 | Shoens |
| 2014/0136762 | A1* | 5/2014 | Li .................. G11C 11/5642 711/103 |
| 2014/0181016 | A1 | 6/2014 | Whitehead et al. |
| 2014/0244935 | A1 | 8/2014 | Ezra et al. |
| 2015/0378766 | A1 | 12/2015 | Beveridge et al. |
| 2015/0378785 | A1 | 12/2015 | Tarasuk-Levin et al. |
| 2016/0150012 | A1 | 5/2016 | Barszczak et al. |
| 2016/0170987 | A1 | 6/2016 | Kesselman |
| 2016/0202927 | A1 | 7/2016 | Klarakis et al. |
| 2016/0224259 | A1 | 8/2016 | Ahrens et al. |
| 2016/0261513 | A1 | 9/2016 | Aingaran et al. |
| 2016/0345207 | A1 | 11/2016 | Kwak et al. |
| 2017/0075842 | A1 | 3/2017 | Su et al. |
| 2017/0185529 | A1* | 6/2017 | Chhabra ............... G06F 12/145 |
| 2017/0192857 | A1 | 7/2017 | Meiri et al. |
| 2018/0095873 | A1 | 4/2018 | Nakagoe et al. |
| 2019/0303490 | A1 | 10/2019 | Chen et al. |
| 2019/0392060 | A1 | 12/2019 | Meiri et al. |
| 2020/0026616 | A1 | 1/2020 | Hu et al. |
| 2020/0097174 | A1 | 3/2020 | Moore et al. |
| 2020/0097363 | A1 | 3/2020 | Moore et al. |
| 2020/0097393 | A1 | 3/2020 | Moore et al. |
| 2020/0125276 | A1 | 4/2020 | Shani et al. |
| 2021/0026731 | A1* | 1/2021 | Li .................. H04L 67/1097 |

OTHER PUBLICATIONS

EMC Corporation, "Unstoppable Data Reduction: Always-on, In-Line, Zero-Penalty, Enterprise-Class, Free,"https://store.emc.com/xtremio, Jul. 2014, 2 pages.

EMC Corporation, "Introduction to XtremIO Virtual Copies," White Paper, Mar. 2016, 39 pages.

EMC Corporation, "XtremIO Data Protection (XDP): Flash-Specific Data Protection, Provided by XtremIO (Ver. 4.0)," White Paper, Apr. 2015, 25 pages.

Dell EMC, "XtremIO v6.0 Specifications," Specification Sheet, 2017, 4 pages.

Dell EMC, "Dell EMC XtremIO X2: Next-Generation All-Flash Array," Data Sheet, 2017, 5 pages.

EMC Corporation, "High Availability, Data Protection and Data Integrity in the XtremIO Architecture," White Paper, Apr. 2015, 28 pages.

Dell EMC, "Introduction to Dell EMC XtremIO X2 Storage Array—A Detailed Review," Dell EMC White Paper, Aug. 2017, 46 pages.

N. Tolia et al., "Opportunistic Use of Content Addressable Storage for Distributed File Systems," Proceedings of the USENIX Annual Technical Conference, Jun. 9-14, 2003, 14 pages.

EMC Corporation, "EMC Recoverpoint Replication of XtremIO: Understanding the Essentials of RecoverPoint Snap-Based Replication for XtremIO," EMC White Paper, Aug. 2015, 31 pages.

Dell EMC, "Introduction to Dell EMC XtremIO X2 Storage Array—A Detailed Review," Dell EMC White Paper, Apr. 2018, 52 pages.

Dell EMC, "Introduction to XtremIO Metadata-Aware Replication," Dell EMC White Paper, Apr. 2018, 18 pages.

Dell EMC, "PowerMax OS," Dell EMC PowerMax Family Product Guide, May 2019, 192 pages.

Dell EMC, "Dell EMC VxRack FLEX," Dell EMC Product Overview, 2018, 5 pages.

U.S. Appl. No. 15/662,708, filed in the name of Xiangping Chen et al. on Jul. 28, 2017, and entitled "Token-Based Data Flow Control in a Clustered Storage System."

U.S. Appl. No. 15/793,121, filed in the name of David Meiri et al. on Oct. 25, 2017, and entitled "Opportunistic Compression of Replicated Data in a Content Addressable Storage System."

U.S. Appl. No. 15/824,536, filed in the name of Christopher Sayles et al. on Nov. 28, 2017, and entitled "Storage System with Asynchronous Messaging between Processing Modules for Data Replication."

U.S. Appl. No. 16/253,793, filed in the name of Yuval Harduf et al. on Jan. 22, 2019, and entitled "Storage System with Data Consistency Checking in Synchronous Replication Using Active Snapshot Set."

U.S. Appl. No. 16/265,131, filed in the name of Lior Kamran et al. on Feb. 1, 2019, and entitled "Storage System with Write Cache Release Protection."

U.S. Appl. No. 16/343,942, filed in the name of Yonatan Shtarkman et al. on Apr. 22, 2019, and entitled "Snapshot-Enabled Storage System Implementing Algorithm for Efficient Reclamation of Snapshot Storage Space."

U.S. Appl. No. 16/343,949, filed in the name of Asaf Porath et al. on Apr. 22, 2019, and entitled "Snapshot-Enabled Storage System Implementing Algorithm for Efficient Reading of Data from Stored Snapshots."

U.S. Appl. No. 16/396,897, filed in the name of Anton Kucherov et al. on Apr. 29, 2019, and entitled "Storage System with Deduplication-Aware Replication Implemented Using a Standard Storage Command Protocol."

U.S. Appl. No. 16/413,050, filed in the name of Xiangping Chen et al. on May 15, 2019, and entitled "Storage System with Coordinated Recovery across Multiple Input-Output Journals of Different Types."

U.S. Appl. No. 16/530,121, filed in the name of Anton Kucherov et al. on Aug. 2, 2019, and entitled "Memory-Efficient Processing of Raid Metadata Bitmaps."

U.S. Appl. No. 16/663,524, filed in the name of Xiangping Chen et al. on Oct. 25, 2019, and entitled "Storage System with Throughput-Based Timing of Synchronous Replication Recovery."

U.S. Appl. No. 16/665,651, filed in the name of Lior Kamran et al. on Oct. 28, 2019, and entitled "Recovery Flow with Reduced Address Lock Contention in a Content Addressable Storage System."

U.S. Appl. No. 16/671,824, filed in the name of Lior Kamran et al. on Nov. 1, 2019, and entitled "Storage System Capacity Expansion Using Mixed-Capacity Storage Devices."

U.S. Appl. No. 16/693,858, filed in the name of Doron Tal on Nov. 25, 2019, and entitled "Storage System with Prioritized RAID Rebuild."

* cited by examiner

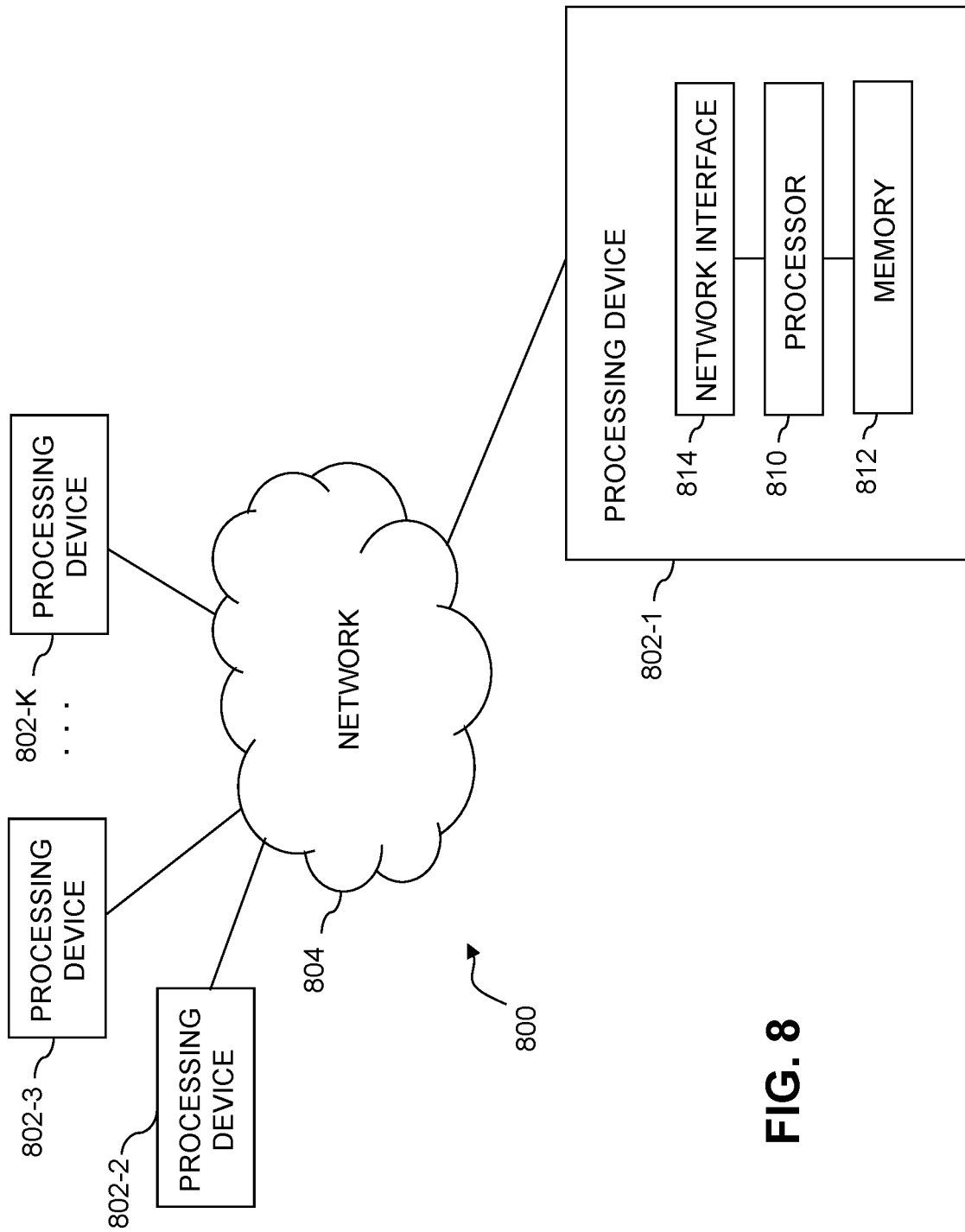

FRONT-END OFFLOAD OF STORAGE SYSTEM PROCESSING

FIELD

The field relates generally to information processing systems, and more particularly to storage in information processing systems.

BACKGROUND

In many information processing systems, storage systems are key elements. Storage systems, such as block based storage systems, are designed to store and retrieve large amounts of data. To store a block of data, a host device typically provides a data block address and data block content to a storage system. The host device also provides the data block address to the storage system to retrieve the data block content stored in the storage system at a physical address. Some storage solutions rely on address-based mapping of data, as well as address-based functionality of a storage system's internal algorithms. For example, computing applications typically rely on address-based mapping and identification of data that is stored and retrieved. Another solution, in which data is mapped internally within a storage system and managed based on its content instead of its address, can provide various substantial advantages. For example, such a content-based storage solution improves storage capacity efficiency since any duplicate data blocks will only occupy the actual capacity of a single instance of that data block. As another example, the content-based storage solution can improve performance since duplicate block writes do not need to be executed internally in the storage system. Content-based storage solutions, however, face various challenges.

SUMMARY

In an illustrative embodiment, an apparatus is disclosed. The apparatus comprises a storage system comprising a front-end device and a plurality of storage nodes. A given storage node of the plurality of storage nodes comprises at least one processor and memory. The front-end device is configured to obtain a write operation comprising at least a first data page and to generate a content-based signature based at least in part on the first data page. The front-end device is further configured to compress the first data page and to generate first compression information corresponding to the first data page. The first compression information comprises an indication that the first data page has been compressed. The front-end device is further configured to provide the generated content-based signature, the compressed first data page and the first compression information to the given storage node.

These and other illustrative embodiments include, without limitation, apparatus, systems, methods and processor-readable storage media.

BRIEF DESCRIPTION OF THE DRAWINGS

FIGS. 7 and 8 show examples of processing platforms that may be utilized to implement at least a portion of an information processing system in illustrative embodiments.

DETAILED DESCRIPTION

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources. Numerous other types of enterprise computing and storage systems are also encompassed by the term "information processing system" as that term is broadly used herein.

Figure 1:
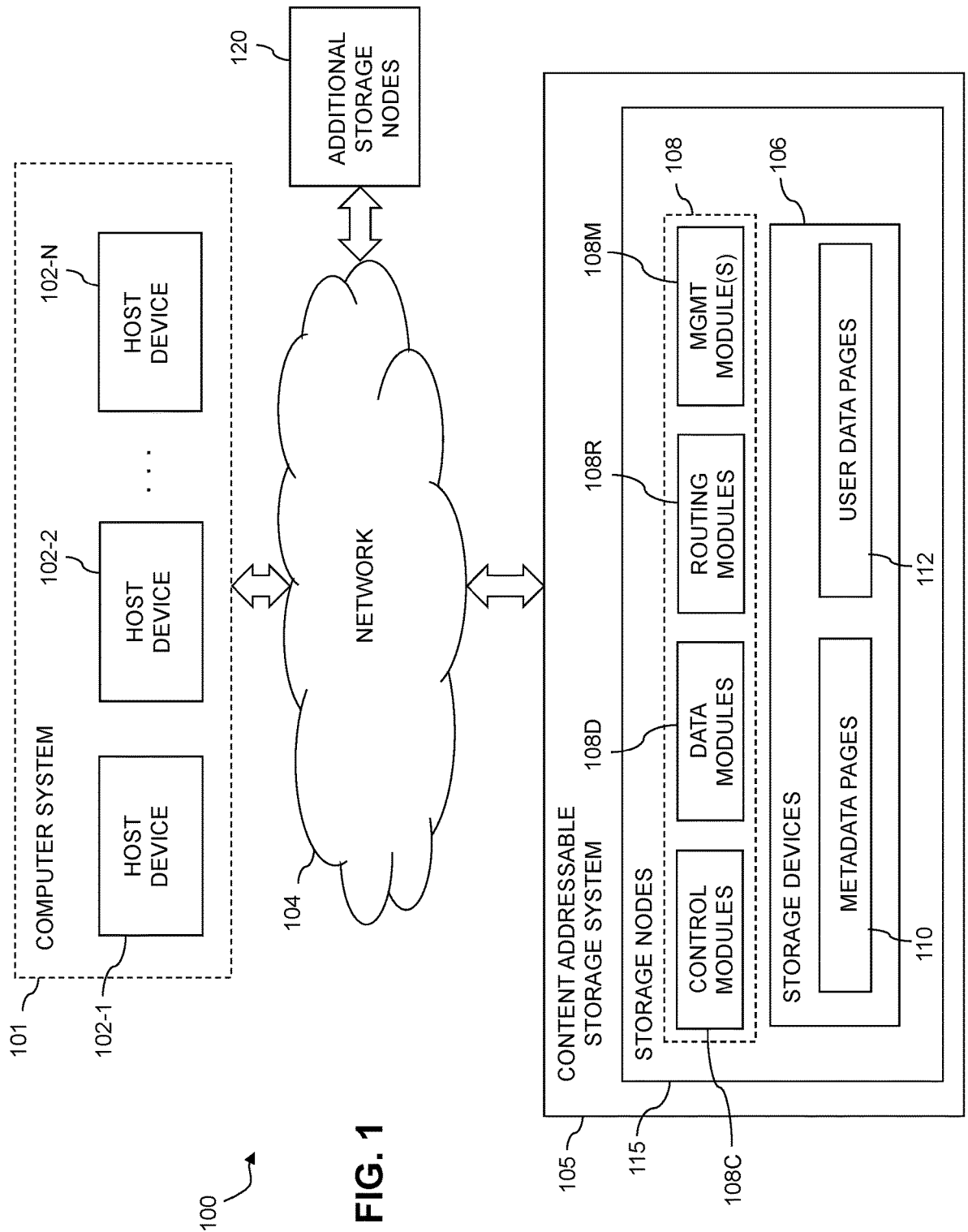
FIG. 1 is a block diagram of an information processing system comprising a content addressable storage system configured for front-end offloading of storage system processing in an illustrative embodiment.

FIG. 1 shows an information processing system 100 configured in accordance with an illustrative embodiment. The information processing system 100 comprises a computer system 101 that includes host devices 102-1, 102-2, . . . 102-N. The host devices 102 communicate over a network 104 with a content addressable storage system 105. The content addressable storage system 105 is an example of what is more generally referred to herein as a "storage system," and it is to be appreciated that a wide variety of other types of storage systems can be used in other embodiments. In illustrative embodiments, the content addressable storage system 105 utilizes both content-based mapping and address-based mapping of logical addresses to physical addresses.

The host devices 102 and content addressable storage system 105 illustratively comprise respective processing devices of one or more processing platforms. For example, the host devices 102 and the content addressable storage system 105 can each comprise one or more processing devices each having a processor and a memory, possibly implementing virtual machines and/or containers, although numerous other configurations are possible.

The host devices 102 and content addressable storage system 105 may be part of an enterprise computing and storage system, a cloud-based system or another type of system. For example, the host devices 102 and the content addressable storage system 105 can be part of cloud infrastructure such as an Amazon Web Services (AWS) system. Other examples of cloud-based systems that can be used to provide one or more of host devices 102 and content addressable storage system 105 include Google Cloud Platform (GCP) and Microsoft Azure.

The host devices 102 are configured to write data to and read data from the content addressable storage system 105. The host devices 102 and the content addressable storage system 105 may be implemented on a common processing platform, or on separate processing platforms. A wide variety of other types of host devices can be used in other embodiments.

The host devices 102 in some embodiments illustratively provide compute services such as execution of one or more applications on behalf of each of one or more users associated with respective ones of the host devices 102.

The term "user" herein is intended to be broadly construed so as to encompass numerous arrangements of human, hardware, software or firmware entities, as well as combinations of such entities. Compute and/or storage services may be provided for users under a platform-as-a-service (PaaS) model, an infrastructure-as-a-service (IaaS) model and/or a function-as-a-service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The content addressable storage system 105 is accessible to the host devices 102 over the network 104. The content addressable storage system 105 comprises a plurality of storage devices 106 and an associated storage controller 108. The storage devices 106 illustratively store metadata pages 110 and user data pages 112. The user data pages 112 in some embodiments are organized into sets of logical units (LUNs) each accessible to one or more of the host devices 102. The LUNs may be viewed as examples of what are also referred to herein as logical storage volumes of the content addressable storage system 105.

In some embodiments, the storage devices 106 may implement at least one redundant array of independent disks (RAID) 6 arrangement involving multiple ones of the storage devices 106. Additional or alternative RAID or non-RAID arrangements can be used to store data in the storage system 105.

The RAID 6 arrangement in this embodiment illustratively includes an array of different "disks," each a different physical storage device of the storage devices 106. Multiple such physical storage devices are typically utilized to store data of a given LUN or other logical storage volume in the storage system 105. For example, data pages or other data blocks of a given LUN or other logical storage volume can be "striped" along with its corresponding parity information across multiple ones of the disks in the RAID 6 arrangement.

A given RAID 6 arrangement in an illustrative embodiment defines block-level striping with double distributed parity and provides fault tolerance of two drive failures, so that the array continues to operate with up to two failed drives, irrespective of which two drives fail. In the RAID 6 arrangement, data blocks and corresponding p-type and q-type parity information are arranged in a row or stripe. Other data and parity blocks in the RAID 6 arrangement are distributed over the disks in a similar manner, collectively providing a diagonal-based configuration for the p-type and q-type parity information. Other types of RAID implementations can be used, as will be appreciated by those skilled in the art, possibly using error correcting codes in place of parity information.

Additional details regarding exemplary techniques for storing data in RAID arrays such as a RAID 6 arrangement are disclosed in U.S. Pat. No. 9,552,258, entitled "Method and System for Storing Data in RAID Memory Devices," which is incorporated by reference herein.

The storage devices 106 illustratively comprise solid state drives (SSDs). Such SSDs are implemented using non-volatile memory (NVM) devices such as flash memory. Other types of NVM devices that can be used to implement at least a portion of the storage devices 106 include non-volatile random-access memory (NVRAM), phase-change RAM (PC-RAM) and magnetic RAM (MRAM). These and various combinations of multiple different types of NVM devices may also be used.

However, it is to be appreciated that other types of storage devices can be used in other embodiments. For example, a given storage system as the term is broadly used herein can include a combination of different types of storage devices, as in the case of a multi-tier storage system comprising a flash-based fast tier and a disk-based capacity tier. In such an embodiment, each of the fast tier and the capacity tier of the multi-tier storage system comprises a plurality of storage devices with different types of storage devices being used in different ones of the storage tiers. For example, the fast tier may comprise flash drives while the capacity tier comprises hard disk drives. The particular storage devices used in a given storage tier may be varied in other embodiments, and multiple distinct storage device types may be used within a single storage tier. The term "storage device" as used herein is intended to be broadly construed, so as to encompass, for example, flash drives, solid state drives, hard disk drives, hybrid drives or other types of storage devices.

In some embodiments, the content addressable storage system 105 illustratively comprises a scale-out all-flash content addressable storage array such as an XtremIO™ storage array from Dell EMC of Hopkinton, Mass. For example, the content addressable storage system 105 can comprise an otherwise conventional XtremIO™ storage array or other type of content addressable storage system that is suitably modified to incorporate address mapping logic as disclosed herein. Other types of storage arrays, including by way of example VNXx and Symmetrix VMAX® storage arrays also from Dell EMC, can be used to implement content addressable storage system 105 in other embodiments.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing content addressable storage system 105 in illustrative embodiments include all-flash and hybrid flash storage arrays such as Unity™, software-defined storage products such as ScaleIO™ and ViPR®, cloud storage products such as Elastic Cloud Storage (ECS), object-based storage products such as Atmos®, and scale-out NAS clusters comprising Isilon® platform nodes and associated accelerators, all from Dell EMC. Combinations of multiple ones of these and other storage products can also be used in implementing a given storage system in an illustrative embodiment.

The content addressable storage system 105 in the FIG. 1 embodiment is implemented as at least a portion of a clustered storage system and includes a plurality of storage nodes 115 each comprising a corresponding subset of the storage devices 106. Other clustered storage system arrangements comprising multiple storage nodes can be used in other embodiments. A given clustered storage system may include not only storage nodes 115 but also additional storage nodes 120 coupled to network 104. Alternatively, such additional storage nodes 120 may be part of another clustered storage system of the system 100. Each of the storage nodes 115 of the content addressable storage system 105 is assumed to be implemented using at least one processing device comprising a processor coupled to a memory.

Other arrangements of storage nodes or other types of nodes can be used. The term "node" as used herein is intended to be broadly construed and a given such node need not include storage devices.

The storage controller 108 in this embodiment is implemented in a distributed manner so as to comprise a plurality of distributed storage controller components implemented on respective ones of the storage nodes 115. The storage controller 108 is therefore an example of what is more generally referred to herein as a "distributed storage controller." Accordingly, in subsequent description herein, the storage controller 108 is more particularly referred to as a distributed storage controller. Other types of potentially non-distributed storage controllers can be used in other embodiments.

Each of the storage nodes 115 in this embodiment further comprises a set of processing modules configured to communicate over one or more networks with corresponding sets of processing modules on other ones of the storage nodes 115. The sets of processing modules of the storage nodes 115 collectively comprise at least a portion of the distributed storage controller 108 of the content addressable storage system 105.

The modules of the distributed storage controller 108 in the present embodiment more particularly comprise different sets of processing modules implemented on each of the storage nodes 115. The set of processing modules of each of the storage nodes 115 comprises at least a control module 108C, a data module 108D and a routing module 108R. The distributed storage controller 108 further comprises one or more management (MGMT) modules 108M. For example, only a single one of the storage nodes 115 may include a management module 108M. It is also possible that management modules 108M may be implemented on each of at least a subset of the storage nodes 115.

Each of the storage nodes 115 of the content addressable storage system 105 therefore comprises a set of processing modules configured to communicate over one or more networks with corresponding sets of processing modules on other ones of the storage nodes. A given such set of processing modules implemented on a particular storage node illustratively includes at least one control module 108C, at least one data module 108D and at least one routing module 108R, and possibly a management module 108M. These sets of processing modules of the storage nodes collectively comprise at least a portion of the distributed storage controller 108.

Communication links may be established between the various processing modules of the distributed storage controller 108 using well-known communication protocols such as IP, Transmission Control Protocol (TCP), and remote direct memory access (RDMA). For example, respective sets of IP links used in data transfer and corresponding messaging could be associated with respective different ones of the routing modules 108R.

It is assumed in some embodiments that the processing modules of the distributed storage controller 108 are interconnected in a full mesh network, such that a process of one of the processing modules can communicate with processes of any of the other processing modules. Commands issued by the processes can include, for example, remote procedure calls (RPCs) directed to other ones of the processes.

The distributed storage controller 108 of the content addressable storage system 105 in the present embodiment is configured to control the implementation of functionality for front-end offloading of storage system processing as disclosed herein. The distributed storage controller 108 is assumed to comprise a type of "processing device" as that term is broadly used herein, and more particularly comprises at least one processor coupled to a memory.

Various aspects of page storage in the content addressable storage system 105 will now be described in greater detail. As indicated above, the storage devices 106 are configured to store metadata pages 110 and user data pages 112, and in some embodiments may also store additional information not explicitly shown such as checkpoints and write journals. The metadata pages 110 and the user data pages 112 are illustratively stored in respective designated metadata and user data areas of the storage devices 106. Accordingly, metadata pages 110 and user data pages 112 may be viewed as corresponding to respective designated metadata and user data areas of the storage devices 106.

The term "page" as used herein is intended to be broadly construed so as to encompass any of a wide variety of different types of blocks that may be utilized in a block storage device of a storage system. Such storage systems are not limited to content addressable storage systems of the type disclosed in some embodiments herein, but are more generally applicable to any storage system that includes one or more block storage devices. Different native page sizes are generally utilized in different storage systems of different types. For example, XtremIO™ X1 storage arrays utilize a native page size of 8 KB, while XtremIO™ X2 storage arrays utilize a native page size of 16 KB. Larger native page sizes of 64 KB and 128 KB are utilized in VMAX® V2 and VMAX® V3 storage arrays, respectively. The native page size generally refers to a typical page size at which the storage system ordinarily operates, although it is possible that some storage systems may support multiple distinct page sizes as a configurable parameter of the system. Each such page size of a given storage system may be considered a "native page size" of the storage system as that term is broadly used herein.

A given "page" as the term is broadly used herein should therefore not be viewed as being limited to any particular range of fixed sizes. In some embodiments, a page size of 8 KB is used, but this is by way of example only and can be varied in other embodiments. For example, page sizes of 4 KB, 16 KB or other values can be used. Accordingly, illustrative embodiments can utilize any of a wide variety of alternative paging arrangements for organizing the metadata pages 110 and the user data pages 112.

The user data pages 112 are part of a plurality of LUNs configured to store files, blocks, objects or other arrangements of data, each also generally referred to herein as a "data item," on behalf of users associated with host devices 102. Each such LUN may comprise particular ones of the above-noted pages of the user data area. The user data stored in the user data pages 112 can include any type of user data that may be utilized in the system 100. The term "user data" herein is therefore also intended to be broadly construed.

The content addressable storage system 105 is configured to generate hash metadata providing a mapping between content-based digests of respective ones of the user data pages 112 and corresponding physical locations of those pages in the user data area. Content-based digests generated using hash functions are also referred to herein as "hash digests." Such hash digests or other types of content-based digests are examples of what are more generally referred to herein as "content-based signatures" of the respective user data pages 112.

In illustrative embodiments, the content addressable storage system 105 is also configured to generate hash metadata providing a mapping between logical addresses and corresponding physical locations in the user data area that are not content-based. For example, the hash metadata may be based on hashes of the logical block addresses themselves.

The hash metadata generated by the content addressable storage system 105, whether content-based or address-based, is illustratively stored as metadata pages 110 in the metadata area. The generation and storage of the hash metadata is assumed to be performed under the control of the distributed storage controller 108.

Each of the metadata pages 110 characterizes a plurality of the user data pages 112. For example, a given set of user data pages representing a portion of the user data pages 112 illustratively comprises a plurality of user data pages denoted User Data Page 1, User Data Page 2, . . . User Data Page n.

Each of the user data pages 112 in this example is characterized by a LUN identifier, an offset and a hash value. The hash value is either a content-based signature generated as a hash function of content of the corresponding user data page or an address-based hash of a logical address. Illustrative hash functions that may be used to generate the content-based signature or address-based hash include the SHA1 hash function, where SHA denotes Secure Hashing Algorithm, or other secure hashing algorithms known to those skilled in the art, including SHA2, SHA256 and many others. The content-based signatures and address-based hashes are utilized to determine the location of the corresponding user data page within the user data area of the storage devices 106.

Each of the metadata pages 110 in the present embodiment is assumed to have a signature that is not content-based. For example, the metadata page signatures may be generated using hash functions or other signature generation algorithms that do not utilize content of the metadata pages as input to the signature generation algorithm. Also, each of the metadata pages is assumed to characterize a different set of the user data pages.

A given set of metadata pages representing a portion of the metadata pages 110 in an illustrative embodiment comprises metadata pages denoted Metadata Page 1, Metadata Page 2, . . . Metadata Page m, having respective signatures denoted Signature 1, Signature 2, . . . Signature m. Each such metadata page characterizes a different set of n user data pages. For example, the characterizing information in each metadata page can include the LUN identifiers, offsets and hash values for each of the n user data pages that are characterized by that metadata page. It is to be appreciated, however, that the user data and metadata page configurations described above are examples only, and numerous alternative user data and metadata page configurations can be used in other embodiments.

Ownership of a user data logical address space within the content addressable storage system 105 is illustratively distributed among the control modules 108C.

The functionality for front-end offloading of storage system processing in this embodiment is assumed to be distributed across multiple distributed processing modules, including at least a subset of the processing modules 108C, 108D, 108R and 108M of the distributed storage controller 108.

For example, the management module 108M of the distributed storage controller 108 may include mapping logic that engages or otherwise interacts with corresponding control logic instances in at least a subset of the control modules 108C, data modules 108D and routing modules 108R in order to implement content-based and address-based mapping of logical addresses to physical addresses.

In some embodiments, the content addressable storage system 105 comprises an XtremIO™ storage array suitably modified to incorporate techniques for front-end offloading of storage system processing as disclosed herein.

In arrangements of this type, the control modules 108C, data modules 108D and routing modules 108R of the distributed storage controller 108 illustratively comprise respective C-modules, D-modules and R-modules of the XtremIO™ storage array. The one or more management modules 108M of the distributed storage controller 108 in such arrangements illustratively comprise a system-wide management module (SYM module) of the XtremIO™ storage array, although other types and arrangements of system-wide management modules can be used in other embodiments. Accordingly, functionality for front-end offloading of storage system processing in some embodiments is implemented under the control of at least one system-wide management module of the distributed storage controller 108, utilizing the C-modules, D-modules and R-modules of the XtremIO™ storage array.

In the above-described XtremIO™ storage array example, each user data page has a fixed size such as 8 KB and its content-based signature is a 20-byte signature generated using an SHA1 hash function. Also, each page has a LUN identifier and an offset, and so is characterized by <lun_id, offset, signature>.

The content-based signature in the present example comprises a content-based digest of the corresponding data page. Such a content-based digest is more particularly referred to as a "hash digest" of the corresponding data page, as the content-based signature is illustratively generated by applying a hash function such as SHA1 to the content of that data page. The full hash digest of a given data page is given by the above-noted 20-byte signature. The hash digest may be represented by a corresponding "hash handle," which in some cases may comprise a particular portion of the hash digest. The hash handle illustratively maps on a one-to-one basis to the corresponding full hash digest within a designated cluster boundary or other specified storage resource boundary of a given storage system. In arrangements of this type, the hash handle provides a lightweight mechanism for uniquely identifying the corresponding full hash digest and its associated data page within the specified storage resource boundary. The hash digest and hash handle are both considered examples of "content-based signatures" as that term is broadly used herein.

Examples of techniques for generating and processing hash handles for respective hash digests of respective data pages are disclosed in U.S. Pat. No. 9,208,162, entitled "Generating a Short Hash Handle," and U.S. Pat. No. 9,286,003, entitled "Method and Apparatus for Creating a Short Hash Handle Highly Correlated with a Globally-Unique Hash Signature," both of which are incorporated by reference herein.

As mentioned previously, storage controller components in an XtremIO™ storage array illustratively include C-module, D-module and R-module components. For example, separate instances of such components can be associated with each of a plurality of storage nodes in a clustered storage system implementation.

The distributed storage controller 108 in this example is configured to group consecutive pages into page groups, to arrange the page groups into slices, and to assign the slices to different ones of the C-modules. For example, if there are 1024 slices distributed evenly across the C-modules, and there are a total of 16 C-modules in a given implementation, each of the C-modules "owns" 1024/16=64 slices. In such arrangements, different ones of the slices are assigned to different ones of the control modules 108C such that control of the slices within the distributed storage controller 108 is substantially evenly distributed over the control modules 108C of the distributed storage controller 108.

The D-module allows a user to locate a given user data page based on its signature. Each metadata page also has a size of 8 KB and includes multiple instances of the <lun_id, offset, signature> for respective ones of a plurality of the user data pages. Such metadata pages are illustratively generated by the C-module but are accessed using the D-module based on a metadata page signature.

The metadata page signature in this embodiment is a 20-byte signature but is not based on the content of the metadata page. Instead, the metadata page signature is generated based on an 8-byte metadata page identifier that is a function of the LUN identifier and offset information of that metadata page.

If a user wants to read a user data page having a particular LUN identifier and offset, the corresponding metadata page identifier is first determined, then the metadata page signature is computed for the identified metadata page, and then the metadata page is read using the computed signature. In this embodiment, the metadata page signature is more particularly computed using a signature generation algorithm that generates the signature to include a hash of the 8-byte metadata page identifier, one or more ASCII codes for particular predetermined characters, as well as possible additional fields. The last bit of the metadata page signature may always be set to a particular logic value so as to distinguish it from the user data page signature in which the last bit may always be set to the opposite logic value.

The metadata page signature is used to retrieve the metadata page via the D-module. This metadata page will include the <lun_id, offset, signature> for the user data page if the user page exists. The signature of the user data page is then used to retrieve that user data page, also via the D-module.

Write requests processed in the content addressable storage system 105 each illustratively comprise one or more input-output (IO) operations directing that at least one data item of the content addressable storage system 105 be written to in a particular manner. A given write request is illustratively received in the content addressable storage system 105 from a host device, illustratively one of the host devices 102. In some embodiments, a write request is received in the distributed storage controller 108 of the content addressable storage system 105, and directed from one processing module to another processing module of the distributed storage controller 108. For example, a received write request may be directed from a routing module 108R of the distributed storage controller 108 to a particular control module 108C of the distributed storage controller 108. Other arrangements for receiving and processing write requests from one or more host devices can be used.

The term "write request" as used herein is intended to be broadly construed, so as to encompass one or more IO operations directing that at least one data item of a storage system be written to in a particular manner. A given write request is illustratively received in a storage system from a host device.

In the XtremIO™ context, the C-modules, D-modules and R-modules of the storage nodes 115 communicate with one another over a high-speed internal network such as an InfiniBand network. The C-modules, D-modules and R-modules coordinate with one another to accomplish various IO processing tasks.

The write requests from the host devices 102 identify particular data pages to be written in the content addressable storage system 105 by their corresponding logical addresses each comprising a LUN ID and an offset.

As noted above, a given one of the content-based signatures illustratively comprises a hash digest of the corresponding data page, with the hash digest being generated by applying a hash function to the content of that data page. The hash digest may be uniquely represented within a given storage resource boundary by a corresponding hash handle.

The content addressable storage system 105 utilizes a two-level mapping process to map logical block addresses to physical addresses. The first level of mapping uses an address-to-hash (A2H) table and the second level of mapping uses a hash metadata (HMD) table, with the A2H and HMD tables corresponding to respective logical and physical layers of the content-based and address-based signature mapping within the content addressable storage system 105. The HMD table or a given portion thereof in some embodiments disclosed herein is more particularly referred to as a hash-to-data (H2D) table.

The first level of mapping using the A2H table associates logical addresses with respective hash values. For example, content-based mapping may associate logical addresses of respective data pages with respective content-based signatures of those data pages. Address-based mapping may associate logical addresses with respective hashes of those logical addresses. This is also referred to as logical layer mapping. For example, each entry in the A2H table includes a logical block address and the hash value, e.g., a content-based signature or hash handle or a hash of the logical block address. In some embodiments, the logical block address may be used as a key for accessing the entries in the table.

The second level of mapping using the HMD table associates respective ones of the hash values with respective physical storage locations in one or more of the storage devices 106. This is also referred to as physical layer mapping. For example, an entry in the H2D table may include a hash value, a reference count, and a physical offset for the data page. In some embodiments, the hash value may be used as a key for accessing the entries in the H2D table.

For a given write request, both of the corresponding H2D and A2H tables are updated in conjunction with the processing of that write request.

The A2H and H2D tables described above are examples of what are more generally referred to herein as "mapping tables" of respective first and second distinct types. Other types and arrangements of mapping tables or other content-based signature mapping information may be used in other embodiments.

Such mapping tables are still more generally referred to herein as "metadata structures" of the content addressable storage system 105. It should be noted that additional or alternative metadata structures can be used in other embodiments. References herein to particular tables of particular types, such as A2H, H2D, and HMD tables, and their respective configurations, should be considered non-limiting and are presented by way of illustrative example only.

The logical block addresses or LBAs of a logical layer of the content addressable storage system 105 correspond to respective physical blocks of a physical layer of the content addressable storage system 105. The user data pages of the logical layer are organized by LBA and are referenced via respective hash values to particular physical blocks of the physical layer using the A2H and HMD tables.

Each of the physical blocks has an associated reference count that is maintained within the content addressable storage system 105, e.g., within the H2D table. The reference count for a given physical block indicates the number of logical blocks that point to that same physical block, e.g., the block found at the corresponding physical offset in the H2D table.

In releasing logical address space in the storage system, a dereferencing operation is generally executed for each of the LBAs being released. More particularly, the reference count of the corresponding physical block is decremented. A reference count of zero indicates that there are no longer any logical blocks that reference the corresponding physical block, and so that physical block can be released.

It should also be understood that the particular arrangement of storage controller processing modules 108C, 108D, 108R and 108M as shown in the FIG. 1 embodiment is presented by way of example only. Numerous alternative arrangements of processing modules of a distributed storage controller may be used to implement functionality for front-end offloading of storage system processing in other embodiments.

Additional examples of content addressable storage functionality implemented in some embodiments by control modules 108C, data modules 108D, routing modules 108R and management module(s) 108M of distributed storage controller 108 can be found in U.S. Pat. No. 9,104,326, entitled "Scalable Block Data Storage Using Content Addressing," which is incorporated by reference herein. Alternative arrangements of these and other storage node processing modules of a distributed storage controller in a content addressable storage system can be used in other embodiments.

As indicated previously, the host devices 102 and content addressable storage system 105 in the FIG. 1 embodiment are assumed to be implemented using at least one processing platform each comprising one or more processing devices each having a processor coupled to a memory. Such processing devices can illustratively include particular arrangements of compute, storage and network resources.

The host devices 102 and the content addressable storage system 105 may be implemented on respective distinct processing platforms, although numerous other arrangements are possible. For example, in some embodiments at least portions of the host devices 102 and the content addressable storage system 105 are implemented on the same processing platform. The content addressable storage system 105 can therefore be implemented at least in part within at least one processing platform that implements at least a one of the host devices 102.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the host devices 102 and the content addressable storage system 105 to reside in different data centers. Numerous other distributed implementations of the host devices 102 and/or the content addressable storage system 105 are possible. Accordingly, the content addressable storage system 105 can also be implemented in a distributed manner across multiple data centers.

Additional examples of processing platforms utilized to implement host devices and/or storage systems in illustrative embodiments will be described in more detail below in conjunction with FIGS. 7 and 8.

It is to be appreciated that these and other features of illustrative embodiments are presented by way of example only, and should not be construed as limiting in any way.

Accordingly, different numbers, types and arrangements of system components such as host devices 102, network 104, content addressable storage system 105, storage devices 106, storage controllers 108 and storage nodes 115 can be used in other embodiments.

It should be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

For example, in some embodiments, at least portions of the functionality for front-end offloading of storage system processing as disclosed herein can be implemented in a host device, in a storage system, or partially in a host device and partially in a storage system.

Illustrative embodiments are therefore not limited to arrangements in which all such functionality is implemented in a host device or a storage system, and therefore encompass various hybrid arrangements in which the functionality is distributed over one or more host devices and one or more storage systems, each comprising one or more processing devices.

Figure 2:
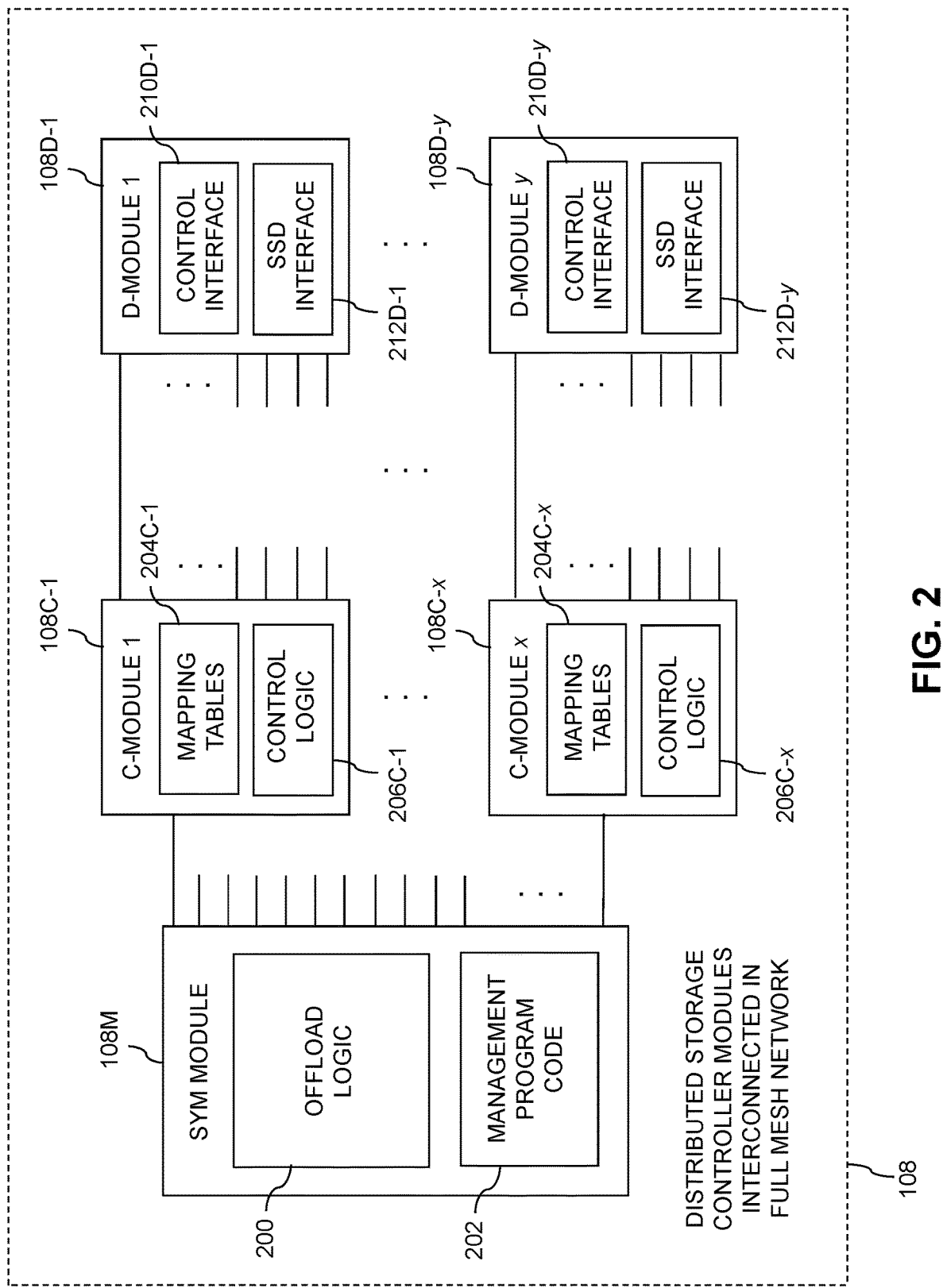
FIG. 2 illustrates a portion of a distributed storage controller of a content addressable storage system showing one possible arrangement utilizing control modules and data modules interconnected by a mesh network and configured for front-end offloading of storage system processing in an illustrative embodiment.

Referring now to FIG. 2, a more detailed view of a portion of the distributed storage controller 108 in an illustrative embodiment is shown. This embodiment illustrates an example arrangement of control modules 108C, data modules 108D and a management module 108M of the distributed storage controller 108. It is assumed in this embodiment that these and possibly other modules of the distributed storage controller 108 are interconnected in a full mesh network, such that each of the modules can communicate with each of the other modules, although other types of networks and different module interconnection arrangements can be used in other embodiments.

The management module 108M of the distributed storage controller 108 in this embodiment more particularly comprises a system-wide management module or SYM module of the type mentioned previously. Although only a single SYM module is shown in this embodiment, other embodiments can include multiple instances of the SYM module possibly implemented on different ones of the storage nodes. It is therefore assumed that the distributed storage controller 108 comprises one or more management modules 108M.

A given instance of management module 108M comprises offload logic 200 and associated management program code 202. The management module 108M communicates with control modules 108C-1 through 108C-x, also denoted as C-module 1 through C-module x. The control modules 108C communicate with data modules 108D-1 through 108D-y, also denoted as D-module 1 through D-module y. The variables x and y are arbitrary integers greater than one, and may but need not be equal. In some embodiments, each of the storage nodes 115 of the content addressable storage system 105 comprises one of the control modules 108C and one of the data modules 108D, as well as one or more additional modules including one of the routing modules 108R. A wide variety of alternative configurations of nodes and processing modules are possible in other embodiments. Also, the term "storage node" as used herein is intended to be broadly construed, and may comprise a node that implements storage control functionality but does not necessarily incorporate storage devices.

The control modules 108C-1 through 108C-x in the FIG. 2 embodiment comprise respective sets of mapping tables 204C-1 through 204C-x, e.g., sets of A2H and H2D tables. The A2H tables are utilized to store address-to-hash mapping information and the H2D tables are utilized to store hash-to-data mapping information, in support of mapping of logical addresses for respective pages to corresponding physical addresses for those pages via respective hashes or other types of content-based or address-based signatures, as described in further detail elsewhere herein. The control modules 108C-1 through 108C-x further comprise corresponding instances of control logic 206C-1 through 206C-x that interact with the offload logic 200 of the management module 108M to support front-end offloading of storage system processing as disclosed herein. While described as being included in the control modules 108C, in some embodiments, some or all of the mapping tables 204C may also or alternatively be included in other modules of the controller 108 such as, e.g., the data modules 108D. For example, in some embodiments, the A2H tables may be included in the control modules 108C while the H2D tables may be included in the data modules 108D. Any other arrangement for the mapping tables 204C may also or alternatively be used.

The control modules 108C may further comprise additional components not explicitly shown in FIG. 2, such as respective messaging interfaces that are utilized by the control modules 108C to generate control-to-routing messages for transmission to the routing modules 108R, and to process routing-to-control messages received from the routing modules 108R. Such messaging interfaces can also be configured to generate messages for transmission to the management module 108M and to process instructions and other messages received from the management module 108M.

The data modules 108D-1 through 108D-y in the FIG. 2 embodiment comprise respective control interfaces 210D-1 through 210D-y. These control interfaces 210D support communication between the data modules 108D and corresponding ones of the control modules 108C. Also included in the data modules 108D-1 through 108D-y are respective SSD interfaces 212D-1 through 212D-y. These SSD interfaces 212D support communications with corresponding ones of the storage devices 106. As mentioned above, in some embodiments, some or all of the mapping tables 204C may also or alternatively be included in the data modules 108D.

Figure 3:
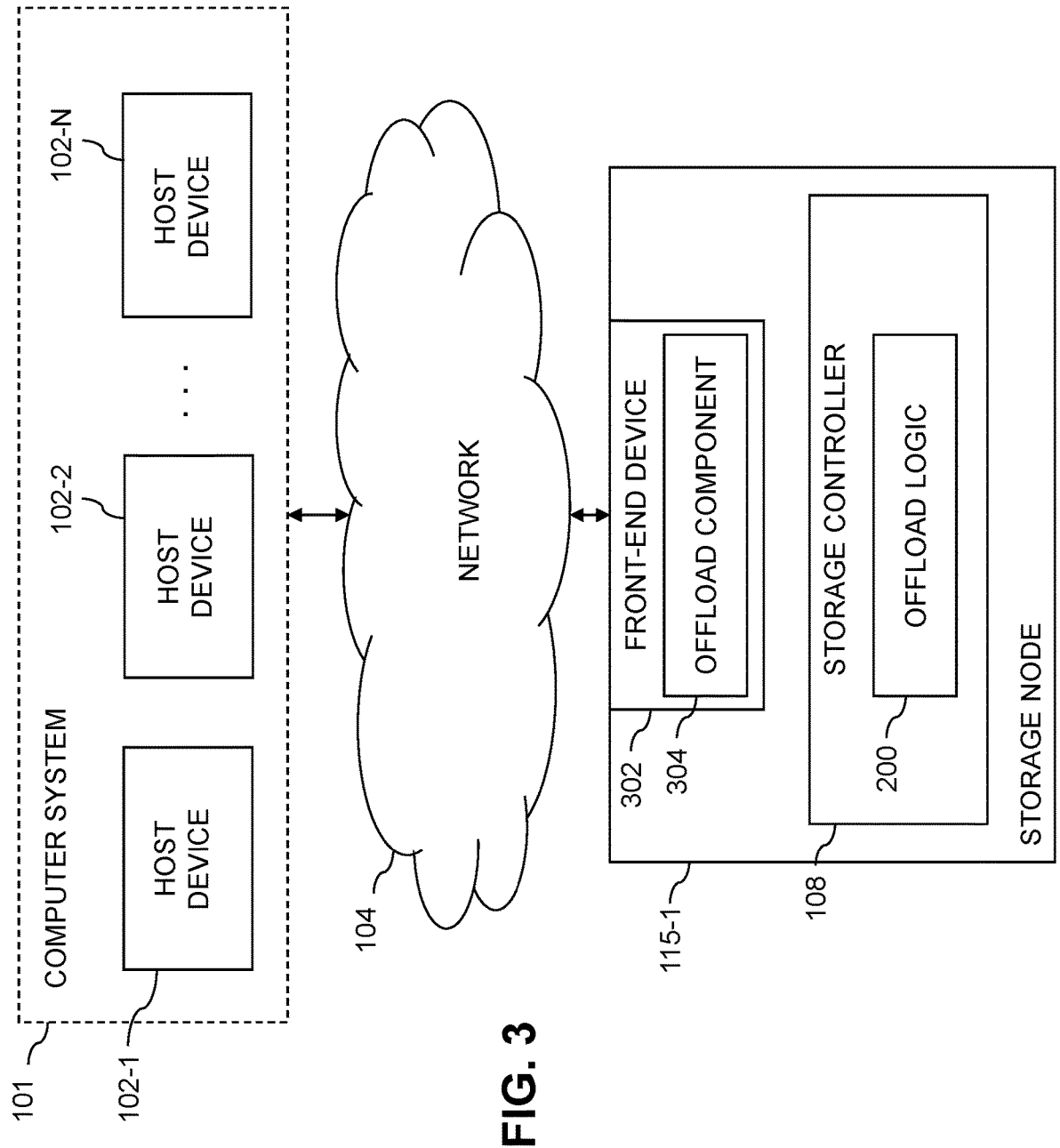
FIG. 3 illustrates an example storage node of a content addressable storage system in an illustrative embodiment.

With reference to FIG. 3, an example storage node 115-1 comprises a storage controller 108 and a front-end device 302 that supports communication with the host devices 102 via the network 104. The front-end device 302 may comprise, for example, network interface circuitry such as, e.g., a Network Interface Card (NIC), smart NIC, FPGA, system on chip (SOC) or other circuitry that is configured to process incoming transmissions from the host devices 102 via the network 104 and to transmit responses back to the host devices 102. The front-end device 302 may also be configured to support Remote Direct Memory Access (RDMA). In illustrative embodiments, the front-end device 302 is separate from the storage controller 108 and comprises separate processing capabilities and circuitry from the processors and circuitry of the storage controller 108. Any of the storage nodes 115 may also comprise similar components and functionality to those described herein for storage node 115-1.

In a typical CAS system, a substantial amount of the processing resources of the storage controller are spent on calculating hash signatures for uniquely identifying data blocks and on the compression of the data blocks for data reduction and storage efficiency purposes. These calculations have both direct and indirect implications on the system performance. For example, this processing can leave fewer available processing cycles for the performance of other operations by the storage controller. In addition, the later in the write flow that the compression is performed, the greater the amount of processing resources that need to be devoted to processing uncompressed data, which may cause inefficiencies in the utilization of the processing and storage resources and may become a bottleneck that limits the system performance.

For example, in order to improve the latency of write IO requests, a typical storage system uses a write cache component backed by a write cache journal to store data buffers of write IO requests in a non-volatile storage media such as NVRAM. After persisting the data buffer in the write cache journal, the write IO request may be acknowledged even though the data has not yet been destaged to persist the data to the storage devices. The destaging is then performed asynchronously as processing resources become available or as the size or number of entries in the write cache journal exceed a threshold amount.

As an example, the typical write flow may comprise the following steps:

1. A write IO request is received by a storage node and the data buffer corresponding to the write IO request is stored uncompressed in the write cache journal. The IO is then acknowledged.

2. The content-based signatures or hash handles are calculated for the data buffer by the storage controller of the storage node and a destination storage node is selected, e.g., based on a Hash-to-Node mapping table that maps the ownership of each content-based signature to one of the storage nodes. The destination storage node may be any storage node in the storage system.

3. The data buffer is transferred to the destination storage node over the network.

4. The storage controller of the destination storage node compresses the data buffer and the compressed data buffer is written to storage devices.

As mentioned above, the calculation of the content-based signature and the compression of the data buffer by the storage controllers of the storage nodes require significant processing resources. In addition, because the compression is performed after the data buffer is written to the write cache journal, the write cache journal stores the uncompressed data buffer. Since the write cache journal memory is limited, storing uncompressed data may result in inefficiencies and may become a bottleneck which limits the performance of the storage system.

In illustrative embodiments, the front-end device 302 comprises an offload component 304 that is configured to perform processing operations on incoming write IO operations and to operate in conjunction with corresponding offload logic 200 of the storage controller 108. The offload component 304 may comprise dedicated circuitry, for example, in the form of an FPGA or SOC, or may comprise software running on one or more processing devices of the front-end device 302.

The generation of the content-based signatures and the data compression for at least some of the data in the data buffer of a write IO operation is performed by the offload component 304 of the front-end device 302 which initially obtains the write IO operation, e.g., offloaded to the front-end device 302, instead of being performed by the processing resources of the storage controller 108 of the receiving and destination storage nodes 115. For example, the offload component 304 may comprise hash calculation and compression engines which offload these processor intensive activities from the processing resources of the storage controller 108. By performing at least some of these calculations prior to storing the data in the write cache component or delivering the write IO operation and data buffer to the destination storage node 115, the required bandwidth for transferring the data buffer between storage nodes 115 and to the write cache component will be reduced while the effective size of the write cache journal will be increased. For example, for a 2:1 compression the effective write cache size is doubled thereby allowing the write cache to store more entries before destaging.

In an illustrative embodiment, an example write flow utilizing offload component 304 and offload logic 200 will now be described.

The front-end device 302 of storage node 115-1 obtains the write IO operation from a host device 102.

The offload component 304 of the front-end device 302 calculates the content-based signature, e.g., a hash digest, for each aligned fixed-size data page found in the data buffer of the obtained write IO operation. For example, where the write IO operation comprises 64 KB of data and the storage system 105 has a 16 KB data page granularity, the offload component 304 will generate four content-based signatures, one for each for aligned 16 KB data page.

In some embodiments, where a partial data page is included in the write IO operation data buffer, e.g., a data page smaller than the 16 KB data page granularity of the storage system 105 in the above example, the partial data page will be provided to the storage controller 108 uncompressed and will need to be combined with other data by the storage controller 108 to generate a full data page as normal. In such an embodiment, a content-based signature is not generated by the offload component 304 for the partial data page. For example, where a write IO operation comprises a data buffer having 76 KB of data (64 KB+12 KB) the offload component 304 will produce four compressed buffers for the aligned fixed-size 16 KB data pages and one uncompressed buffer for the partial 12 KB data page.

In some embodiments, where there is an unaligned data page included in the write IO operation data buffer that has the fixed-size of the storage system 105 granularity, e.g., a data page having the 16 KB data page granularity of the storage system 105 in the above example but that is not aligned for easy processing, the unaligned data page will also be provided to the storage controller 108 uncompressed and processed by the storage controller 108 as normal. In such an embodiment, a content-based signature is not generated by the offload component 304 for the unaligned data page.

The offload component 304 of the front-end device 302 compresses each aligned fixed-size data page for which it generated a content-based signature and generates compression information for each compressed aligned fixed-size data page. For example, the compression information may comprise an indicator, a compression type and a compression size.

The indicator of the compression information indicates whether or not the data page is compressed. The compression type indicates the type of data compression algorithm that is used. For example, the compression type may indicate which compression algorithm was used, the compression ratio that was used or any other information that may be needed to decompress the data. The compression size indicates the size of the compressed data.

In some embodiments, partial data pages and unaligned data pages are not compressed by the front-end device 302 and are instead provided to the storage controller 108 of its corresponding storage node 115 uncompressed.

The offload component 304 provides the compression information and the compressed data pages to the offload logic 200 of the storage controller 108 of its corresponding storage node 115. The offload logic 200 of the storage controller 108 then adds the compressed data pages to the write cache component and associates the compression information with the corresponding write cache entries as part of their metadata such that a later read of the write cache entries, e.g., to service a read IO operation, will also include obtaining the corresponding compression information. The offload logic 200 of the storage controller 108 also handles any partial data pages or unaligned data pages as normal, for example, by generating content-based signatures associated with the partial data pages or unaligned data pages and storing corresponding data pages in the write cache component with associated compression information that indicates that no compression has been performed.

The destination storage node 115 is selected as normal, for example, based on the Hash-to-Node mapping table and the data buffer is transferred to the destination storage node 115 over the network. In this case, the data buffer comprises both the data for the compressed aligned fixed-size data pages, the uncompressed partial data pages and the uncompressed unaligned fixed-size data pages.

The storage controller 108 of the destination storage node 115 performs compression on the partial data pages and unaligned fixed-size data pages as normal as part of a destage process and the compressed data buffer is written to storage devices.

When a read IO operation corresponding to data pages that are found in the write cache component is received, offload logic 200 of the storage controller 108 will check the corresponding metadata for the compression information. If the compression information indicates that the data page is compressed in the write cache component, offload logic 200 will decompress the data page before providing the data page to the host device 102 in response to the read IO operation, for example, using the parameters contained in the compression information such as, e.g., the compression type and the compression size.

During a destaging of the write cache component, i.e. when data pages stored in the write cache are processed and persisted to storage devices, the metadata for each data page is obtained by the offload logic 200 of the storage controller 108 and used to determine whether or not the data page needs to be compressed. For example, if the compression information indicates that the data page was already compressed, i.e., by offload component 304 of the front-end device 302, no further compression is needed and the offload logic 200 persists the compressed data page to the storage devices. If the compression information indicates that the data page was not compressed, e.g., as described above for partial pages or unaligned data pages, offload logic 200 causes the storage controller 108 of the destination storage node 115 to perform the compression operation to compress the data pages before persisting them to the storage devices as normal.

The disclosed offload component 304 and offload logic 200 improve the storage system performance in a number of ways. For example, the processor utilization of the storage controller 108 is reduced by offloading some of the processor intensive calculations for generating content-based signatures and compressing data to the front-end device 302 which frees up significant processor cycles to be available to the storage controller 108 for performing other storage system activities. In addition, the amount of data stored in the write cache journal is effectively increased since compressed data takes up less storage capacity. This allows more data to be written to the write cache journal before requiring destaging. NVRAM bandwidth is also increased, especially in big-blocks scenarios since by compressing the data, more original data can be written to the NVRAM for the same bandwidth. The network bandwidth between the storage nodes is also improved since at least some of the data being transferred between the nodes is now compressed.

The operation of the information processing system 100 will now be described in further detail with reference to the flow diagrams of FIGS. 4-6.

Figure 4:
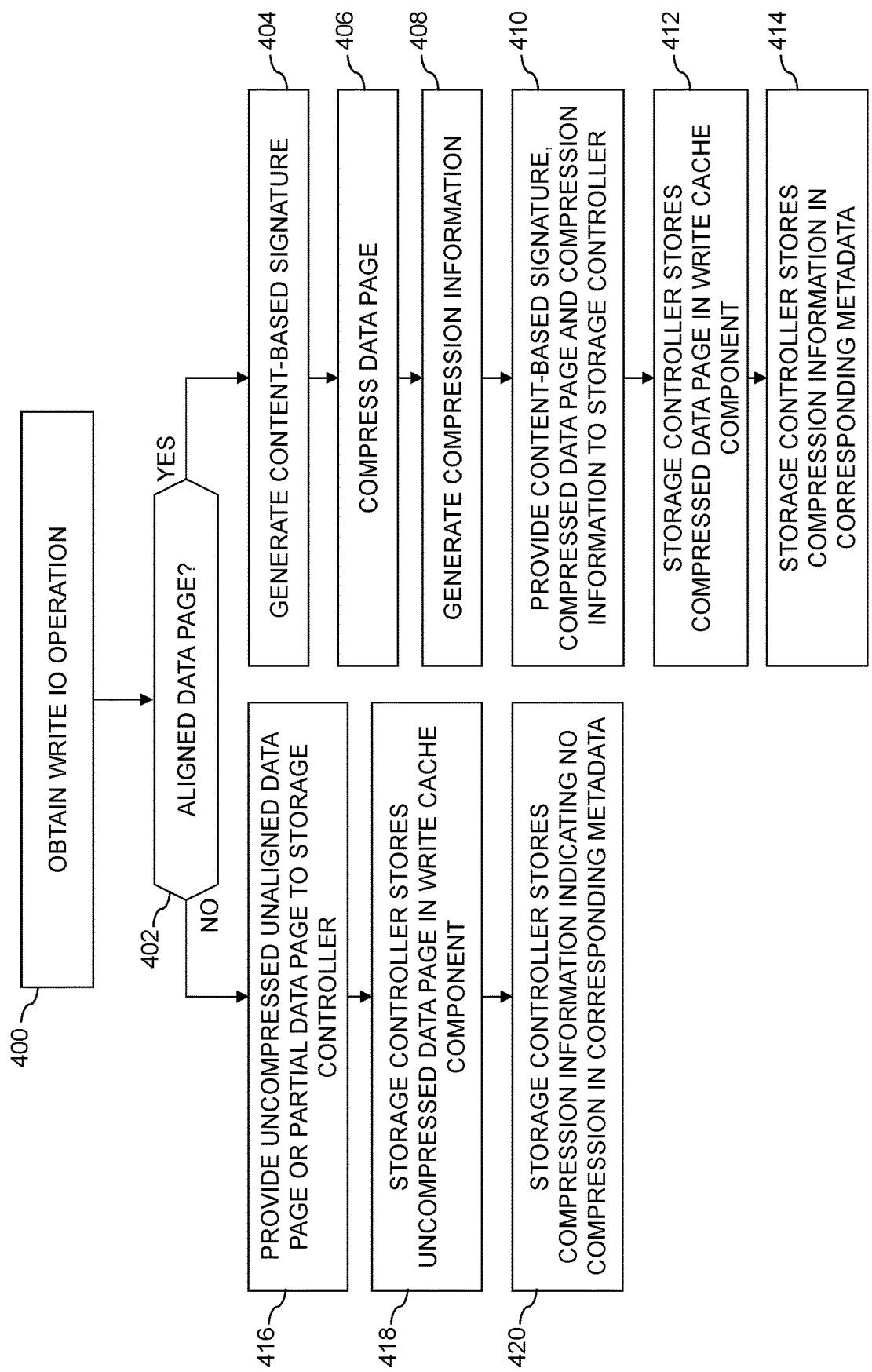
FIG. 4 is a flow diagram showing an example process for processing a write input-output (IO) request in accordance with the functionality for front-end offloading of storage system processing in an illustrative embodiment.

The flow diagram of FIG. 4 illustrates an example process for processing a write IO request in accordance with the functionality for front-end offloading of storage system processing. The process of FIG. 4 includes steps 400 through 420, and is suitable for use in system 100 but is more generally applicable to other types of systems in which it is desirable to offload processing to a front-end device.

The steps of the flow diagrams of FIG. 4 are illustratively performed at least in part under the control of a front-end device and a storage controller of a storage node of a storage system.

At step 400, the front-end device 302 obtains a write IO operation, for example, from a host device 102.

At step 402, the offload component 304 of the front-end device 302 determines whether or not a data page in data buffer of the write IO operation is an aligned fixed-size page. For example, if the data buffer has 64 KB of data and the granularity of the storage system is 16 KB, the offload component 304 would determine that the data buffer comprises four aligned 16 KB data pages. If the data buffer has 76 KB of data, the offload component 304 would determine that the data buffer comprises four aligned 16 KB data pages and one partial 12 KB data page. In some cases, one or more data pages may alternatively be unaligned. If the data page is aligned, the process proceeds to step 404. Otherwise the process proceeds to step 416.

At step 404, offload component 304 generates a content-based signature for the aligned data page.

At step 406, offload component 304 compresses the aligned data page.

At step 408, offload component 304 generates compression information for the compressed data page, for example, as described above.

At step 410, offload component 304 provides the content-based signature, compressed data page and compression information to the storage controller.

At step 412, the storage controller 108 stores the compressed data page in the write cache component.

At step 414, the storage controller 108 stores the compression information in the metadata corresponding to the compressed data page.

Referring back to step 416, if the data page is not aligned or is a partial data page, offload component 304 provides the uncompressed unaligned data page or partial data page to the storage controller 108.

At step 418, the offload logic 200 of the storage controller 108 stores the uncompressed data page in the write cache component.

At step 420, the offload logic 200 of the storage controller 108 stores compression information that indicates that no compression has been performed on the data page in the metadata corresponding to the stored uncompressed data page.

Figure 5:
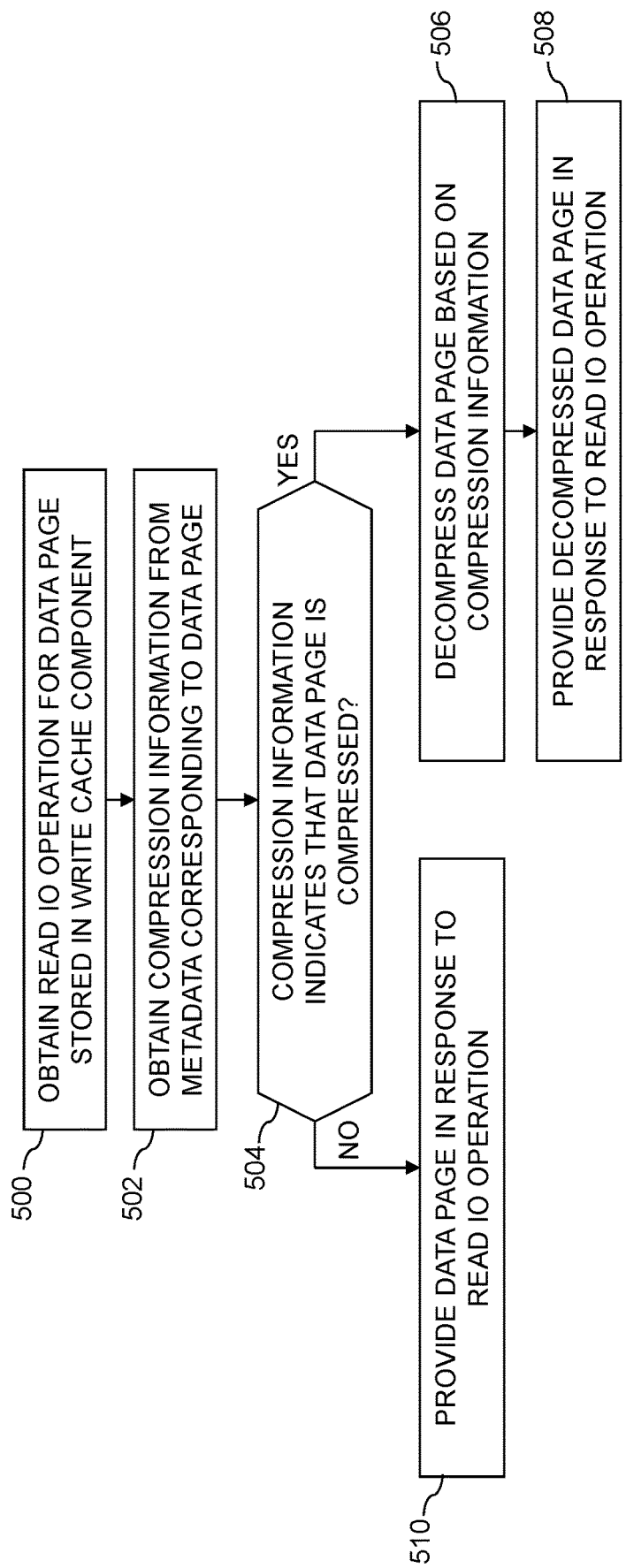
FIG. 5 is a flow diagram showing an example process for processing a read IO request in accordance with the functionality for front-end offloading of storage system processing in an illustrative embodiment.

The flow diagram of FIG. 5 illustrates an example process for processing a read IO request in accordance with the functionality for front-end offloading of storage system processing. The process of FIG. 5 includes steps 500 through 510, and is suitable for use in system 100 but is more generally applicable to other types of systems in which it is desirable to offload processing to a front-end device.

The steps of the flow diagram of FIG. 5 are illustratively performed at least in part under the control of a storage controller of a storage system, such as the distributed storage controller 108 of content addressable storage system 105.

At step 500, the offload logic 200 of the storage controller 108 obtains a read IO operation for a data page stored in the write cache component, e.g., from a host device 102.

At step 502, the offload logic 200 of the storage controller 108 obtains compression information for the data page from the metadata corresponding to the data page.

At step 504, the offload logic 200 of the storage controller 108 determines whether or not the compression information indicates that the data page is compressed. If the compression information indicates that the data page is compressed the process proceeds to step 506. If the compression logic indicates that the data page is not compressed, the process proceeds to step 510.

At step 506, the offload logic 200 of the storage controller 108 decompresses the data page based at least in part on the compression information, for example, using the compression type and compression size found in the compression information.

At step 508, the offload logic 200 of the storage controller 108 provides the decompressed data page in response to the read IO operation.

Referring back to step 510, if the compression information indicates that the data page is not compressed, the offload logic 200 of the storage controller 108 provides the data page in response to the read IO operation.

Figure 6:
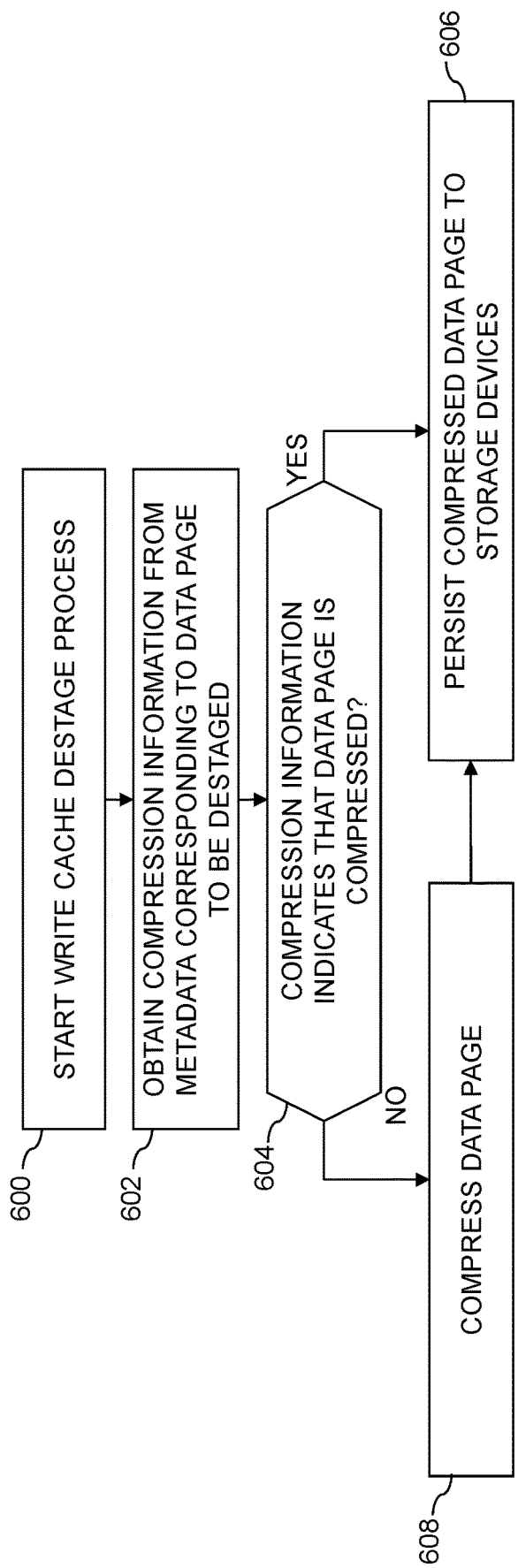
FIG. 6 is a flow diagram showing an example process for performing a destage process in accordance with the functionality for front-end offloading of storage system processing in an illustrative embodiment.

The flow diagram of FIG. 6 illustrates an example process for destaging the write cache component in accordance with the functionality for front-end offloading of storage system processing. The process of FIG. 6 includes steps 600 through 608, and is suitable for use in system 100 but is more generally applicable to other types of systems in which it is desirable to offload processing to a front-end device.

The steps of the flow diagram of FIG. 6 are illustratively performed at least in part under the control of a storage controller of a storage system, such as the distributed storage controller 108 of content addressable storage system 105.

At step 600, the storage controller 108 starts a write cache destage process, for example, when the number of entries or size of the entries in the write cache meets or exceeds a threshold value.

At step 602, the offload logic 200 of the storage controller 108 obtains compression information for a data page to be destaged from the metadata corresponding to the data page.

At step 604, the offload logic 200 of the storage controller 108 determines whether or not the compression information indicates that the data page is compressed. If the compression information indicates that the data page is compressed the process proceeds to step 606. If the compression logic indicates that the data page is not compressed, the process proceeds to step 608.

At step 606, the offload logic 200 of the storage controller 108 persists the compressed data page to the storage devices.

At step 608, if the data page was not compressed, the offload logic 200 compresses the data page and the process proceeds to step 606 and persists the compressed data page.

The particular processing operations and other system functionality described above in conjunction with the flow diagrams of FIGS. 4-6 are presented by way of illustrative examples only, and should not be construed as limiting the scope of the disclosure in any way. Alternative embodiments can use other types of processing operations for implementing functionality for front-end offloading of storage system processing. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to handle multiple page ranges and associated metadata within a given storage system.

Functionality such as that described in conjunction with the flow diagrams of FIGS. 4-6 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

A storage controller such as distributed storage controller 108 that is configured to control performance of one or more steps of the processes of the flow diagrams of FIGS. 4-6 in system 100 can be implemented as part of what is more generally referred to herein as a processing platform comprising one or more processing devices each comprising a processor coupled to a memory. A given such processing device may correspond to one or more virtual machines or other types of virtualization infrastructure such as Docker containers or Linux containers (LXCs). The host devices 102 and content addressable storage system 105 of system 100, as well as other system components, may be implemented at least in part using processing devices of such processing platforms. For example, in the distributed storage controller 108, respective distributed modules can be implemented in respective containers running on respective ones of the processing devices of a processing platform.

Illustrative embodiments of storage systems with functionality for front-end offloading of storage system processing as disclosed herein can provide a number of significant advantages relative to conventional arrangements.

For example, some embodiments provide content addressable storage systems and other types of clustered storage systems that are configured to utilize front-end offloading of storage system processing which may reduce the required processing on the storage controller processing resources. For example, by offloading at least some of the calculations for content-based signatures and compression, the processing resources of the storage controllers are freed up for use in performing other storage system operations. In addition, because the compression of at least some of the data is performed early in the write flow, bandwidth resources of the storage system may be more efficiently utilized due to the smaller size of the compressed data.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for front-end offloading of storage system processing will now be described in greater detail with reference to FIGS. 7 and 8. Although described in the context of system 100, these platforms may also be used to implement at least portions of other information processing systems in other embodiments.

Figure 7:
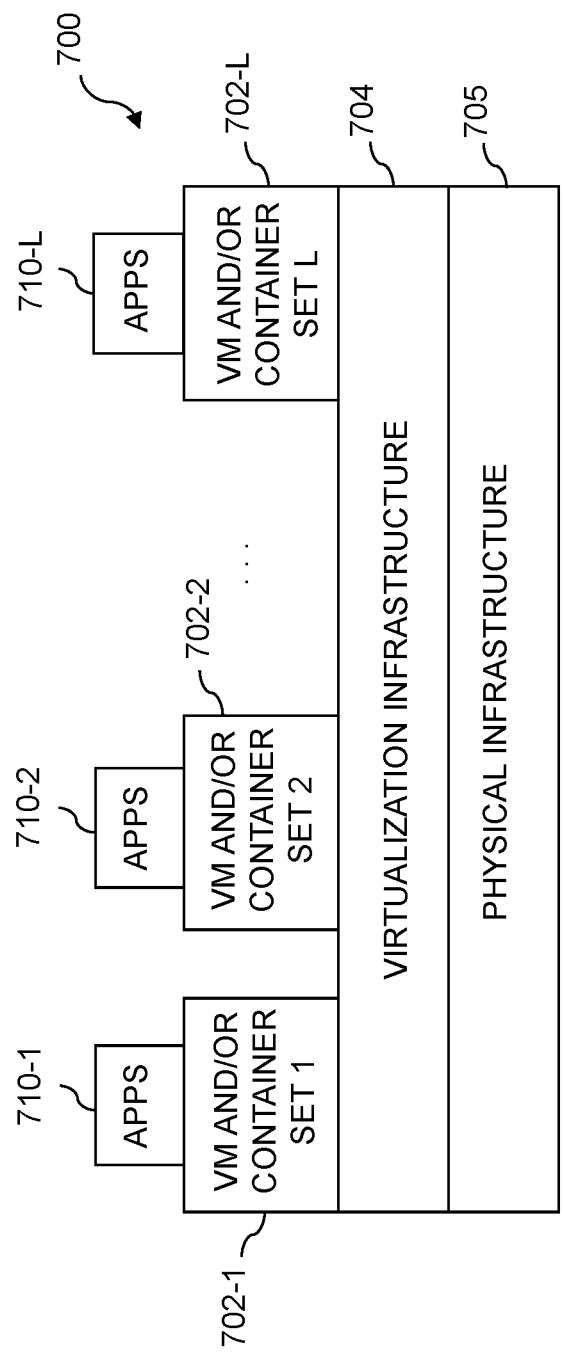

FIG. 7 shows an example processing platform comprising cloud infrastructure 700. The cloud infrastructure 700 comprises a combination of physical and virtual processing resources that may be utilized to implement at least a portion of the information processing system 100. The cloud infrastructure 700 comprises multiple virtual machines and/or container sets 702-1, 702-2, . . . 702-L implemented using virtualization infrastructure 704. The virtualization infrastructure 704 runs on physical infrastructure 705, and illustratively comprises one or more hypervisors and/or operating system level virtualization infrastructure. The operating system level virtualization infrastructure illustratively comprises kernel control groups of a Linux operating system or other type of operating system.

The cloud infrastructure 700 further comprises sets of applications 710-1, 710-2, . . . 710-L running on respective ones of the VMs/container sets 702-1, 702-2, . . . 702-L under the control of the virtualization infrastructure 704. The VMs/container sets 702 may comprise respective VMs, respective sets of one or more containers, or respective sets of one or more containers running in VMs.

In some implementations of the FIG. 7 embodiment, the VMs/container sets 702 comprise respective VMs implemented using virtualization infrastructure 704 that comprises at least one hypervisor. Such implementations can provide storage functionality of the type described above for one or more processes running on a given one of the VMs.

An example of a hypervisor platform that may be used to implement a hypervisor within the virtualization infrastructure 704 is the VMware® vSphere® which may have an associated virtual infrastructure management system such as the VMware® vCenter™. The underlying physical machines may comprise one or more distributed processing platforms that include one or more storage systems.

In other implementations of the FIG. 7 embodiment, the VMs/container sets 702 comprise respective containers implemented using virtualization infrastructure 704 that provides operating system level virtualization functionality, such as support for Docker containers running on bare metal hosts, or Docker containers running on VMs. The containers are illustratively implemented using respective kernel control groups of the operating system. Such implementations can provide storage functionality of the type described above for one or more processes running on different ones of the containers. For example, a container host device supporting multiple containers of one or more container sets can implement one or more instances of the processes of FIGS. 4-6 for front-end offloading of storage system processing.

As is apparent from the above, one or more of the processing modules or other components of system 100 may each run on a computer, server, storage device or other processing platform element. A given such element may be viewed as an example of what is more generally referred to herein as a "processing device." The cloud infrastructure 700 shown in FIG. 7 may represent at least a portion of one processing platform. Another example of such a processing platform is processing platform 800 shown in FIG. 8.

The processing platform 800 in this embodiment comprises a portion of system 100 and includes a plurality of processing devices, denoted 802-1, 802-2, 802-3, . . . 802-K, which communicate with one another over a network 804.

The network 804 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 802-1 in the processing platform 800 comprises a processor 810 coupled to a memory 812.

The processor 810 may comprise a microprocessor, a microcontroller, an application-specific integrated circuit (ASIC), a field-programmable gate array (FPGA), a graphics processing unit (GPU) or other type of processing circuitry, as well as portions or combinations of such circuitry elements.

The memory 812 may comprise random access memory (RAM), read-only memory (ROM), flash memory or other types of memory, in any combination. The memory 812 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 802-1 is network interface circuitry 814, which is used to interface the processing device with the network 804 and other system components, and may comprise conventional transceivers.

The other processing devices 802 of the processing platform 800 are assumed to be configured in a manner similar to that shown for processing device 802-1 in the figure.

Again, the particular processing platform 800 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure such as VxRail™, VxRack™, VxRack™ FLEX, VxBlock™ or Vblock® converged infrastructure from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the storage functionality of one or more components of a host device or storage system as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, host devices, storage systems, storage nodes, storage devices, storage controllers, and associated control logic. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
a storage system comprising a front-end device and a plurality of storage nodes, a given storage node of the plurality of storage nodes comprising at least one processor and memory, the front-end device being configured:
to obtain a write operation, the write operation comprising at least a first data page;
to generate a content-based signature based at least in part on the first data page;
to compress the first data page;
to generate first compression information corresponding to the first data page, the first compression information comprising an indication that the first data page has been compressed; and
to provide the generated content-based signature, the compressed first data page and the first compression information to the given storage node;
wherein the at least one processor of the given storage node is configured to add the compressed first data page and first compression information to a write cache component of the storage system based at least in part on the generated content-based signature.

2. The apparatus of claim 1 wherein:
the write operation comprises a plurality of data pages, the plurality of data pages comprising the first data page and at least one partial data page; and
the front-end device is further configured to provide the at least one partial data page to the given storage node uncompressed.

3. The apparatus of claim 1 wherein:
the write operation comprises a plurality of data pages, the plurality of data pages comprising the first data page and a second data page;
the first data page is an aligned data page;
the second data page is a non-aligned data page; and
the front-end device is further configured to provide the second data page to the given storage node uncompressed.

4. The apparatus of claim 1 wherein the at least one processor of the given storage node is further configured:
to obtain a read operation that corresponds to the first data page;
to obtain the first compression information from the write cache component;
to determine that the first compression information comprises the indication that the first data page has been compressed;
to obtain the compressed first data page from the write cache component;
to decompress the compressed first data page based at least in part on the first compression information; and
to provide the decompressed first data page in response to the obtained read operation.

5. The apparatus of claim 4 wherein:
the first compression information further comprises a compression type and a compression size corresponding to the compression of the first data page; and
decompressing the compressed first data page based at least in part on the first compression information comprises decompressing the compressed first data page based at least in part on the compression type and compression size found in the first compression information.

6. The apparatus of claim 1 wherein the at least one processor of the given storage node is further configured:
to obtain a read operation that corresponds to a second data page;
to obtain second compression information corresponding to the second data page from the write cache component;
to determine that the second compression information comprises an indication that the second data page has not been compressed;
to obtain the second data page from the write cache component; and
to provide the second data page in response to the obtained read operation.

7. The apparatus of claim 6 wherein the at least one processor of the given storage node is further configured, as part of a destage process in which data pages stored by the write cache component are persisted to storage devices of the storage system:
to obtain the first compression information corresponding to the first data page from the write cache component;
to determine that the first compression information comprises an indication that the first data page is compressed;
to persist the compressed first data page to the storage devices;
to obtain the second compression information corresponding to the second data page from the write cache component;
to determine that the second compression information comprises an indication that the second data page is uncompressed;
to compress the second data page; and
to persist the compressed second data page to the storage devices.

8. The apparatus of claim 1 wherein the front-end device comprises additional processing circuitry separate from the at least one processor and memory of the given storage node.

9. A method comprising:
obtaining, by a front-end device of a storage system, a write operation, the write operation comprising at least a first data page;
generating, by the front-end device, a content-based signature based at least in part on the first data page;
compressing, by the front-end device, the first data page;
generating, by the front-end device, first compression information corresponding to the first data page, the first compression information comprising an indication that the first data page has been compressed; and
providing, by the front-end device, the generated content-based signature, the compressed first data page and the first compression information to a given storage node of a plurality of storage nodes of the storage system;
wherein the method further comprises adding, by at least one processor of the given storage node, the compressed first data page and first compression information to a write cache component of the storage system based at least in part on the generated content-based signature.

10. The method of claim 9 wherein:
the write operation comprises a plurality of data pages, the plurality of data pages comprising the first data page and at least one partial data page; and the method further comprises providing, by the front-end device, the at least one partial data page to the given storage node uncompressed.

11. The method of claim 9 wherein:
the write operation comprises a plurality of data pages, the plurality of data pages comprising the first data page and a second data page;
the first data page is an aligned data page;
the second data page is a non-aligned data page; and
the method further comprises providing, by the front-end device, the second data page to the given storage node uncompressed.

12. The method of claim 9 wherein the method further comprises, by the at least one processor of the given storage node:
obtaining a read operation that corresponds to the first data page;
obtaining the first compression information from the write cache component;
determining that the first compression information comprises the indication that the first data page has been compressed;
obtaining the compressed first data page from the write cache component;
decompressing the compressed first data page based at least in part on the first compression information; and
providing the decompressed first data page in response to the obtained read operation.

13. The method of claim 12 wherein:
the first compression information further comprises a compression type and a compression size corresponding to the compression of the first data page; and
decompressing the compressed first data page based at least in part on the first compression information comprises decompressing the compressed first data page based at least in part on the compression type and compression size found in the first compression information.

14. The method of claim 9 wherein the method further comprises, by the at least one processor of the given storage node:
obtaining a read operation that corresponds to a second data page;
obtaining second compression information corresponding to the second data page from the write cache component;
determining that the second compression information comprises an indication that the second data page has not been compressed;
obtaining the second data page from the write cache component; and
providing the second data page in response to the obtained read operation.

15. The method of claim 14 wherein the method further comprises, as part of a destage process in which data pages stored by the write cache component are persisted to storage devices of the storage system, by the at least one processor of the given storage node:
obtaining the first compression information corresponding to the first data page from the write cache component;
determining that the first compression information comprises an indication that the first data page is compressed;
persisting the compressed first data page to the storage devices;

obtaining the second compression information corresponding to the second data page from the write cache component;
determining that the second compression information comprises an indication that the second data page is uncompressed;
compressing the second data page; and
persisting the compressed second data page to the storage devices.

16. A computer program product comprising a non-transitory processor-readable storage medium having stored therein program code of one or more software programs, wherein the program code when executed by a storage system causes a front-end device of the storage system:
to obtain a write operation, the write operation comprising at least a first data page;
to generate a content-based signature based at least in part on the first data page;
to compress the first data page;
to generate first compression information corresponding to the first data page, the first compression information comprising an indication that the first data page has been compressed; and
to provide the generated content-based signature, the compressed first data page and the first compression information to a given storage node of a plurality of storage nodes of the storage system;
wherein the program code when executed by the storage system further causes the given storage node to add the compressed first data page and first compression information to a write cache component of the storage system based at least in part on the generated content-based signature.

17. The computer program product of claim 16 wherein:
the write operation comprises a plurality of data pages, the plurality of data pages comprising the first data page, a second data page and at least one partial data page;
the first data page is an aligned data page;
the second data page is a non-aligned data page; and
the program code when executed by the storage system further causes the front-end device to provide the second data page and the at least one partial data page to the given storage node uncompressed.

18. The computer program product of claim 16 wherein:
the first compression information further comprises a compression type and a compression size corresponding to the compression of the first data page; and
the program code when executed by the storage system further causes the given storage node:
to obtain a read operation that corresponds to the first data page;
to obtain the first compression information from the write cache component;
to determine that the first compression information comprises the indication that the first data page has been compressed;
to obtain the compressed first data page from the write cache component;
to decompress the compressed first data page based at least in part on the compression type and compression size found in the first compression information; and
to provide the decompressed first data page in response to the obtained read operation.

19. An apparatus comprising:
a storage system comprising a front-end device and a plurality of storage nodes, a given storage node of the plurality of storage nodes comprising at least one processor and memory, the front-end device being configured:

to obtain a write operation, the write operation comprising at least a first data page;

to generate a content-based signature based at least in part on the first data page;

to compress the first data page;

to generate first compression information corresponding to the first data page, the first compression information comprising an indication that the first data page has been compressed; and to provide the generated content-based signature, the compressed first data page and the first compression information to the given storage node;

wherein the write operation comprises a plurality of data pages, the plurality of data pages comprising the first data page and a second data page;

wherein the first data page is an aligned data page;

wherein the second data page is a non-aligned data page; and wherein the front-end device is further configured to provide the second data page to the given storage node uncompressed.

20. A method comprising:

obtaining, by a front-end device of a storage system, a write operation, the write operation comprising at least a first data page;

generating, by the front-end device, a content-based signature based at least in part on the first data page;

compressing, by the front-end device, the first data page;

generating, by the front-end device, first compression information corresponding to the first data page, the first compression information comprising an indication that the first data page has been compressed; and providing, by the front-end device, the generated content-based signature, the compressed first data page and the first compression information to a given storage node of a plurality of storage nodes of the storage system;

wherein the write operation comprises a plurality of data pages, the plurality of data pages comprising the first data page and a second data page;

wherein the first data page is an aligned data page;

wherein the second data page is a non-aligned data page; and wherein the front-end device is further configured to provide the second data page to the given storage node uncompressed.

* * * * *